Jan. 5, 1943.  H. M. DODGE  2,307,671

PISTON FOR FLUID ACTUATED DEVICES

Filed Sept. 20, 1941

INVENTOR
*Howard M. Dodge*
BY
*Evans + McCoy*
ATTORNEYS

Patented Jan. 5, 1943

2,307,671

UNITED STATES PATENT OFFICE 2,307,671

PISTON FOR FLUID ACTUATED DEVICES

Howard M. Dodge, Wabash, Ind., assignor to The General Tire & Rubber Company, Akron, Ohio, a corporation of Ohio Application September 20, 1941, Serial No. 411,692

2 Claims. (Cl. 309—4)

This invention relates to fluid actuated pistons, and more particularly to pistons of the character used in the actuating cylinders for hydraulic vehicle brakes.

It is an object of the invention to provide a piston of the character mentioned in which the body is formed primarily of resilient deformable material, such as rubber, natural or synthetic.

Another object of the invention is to provide a deformable type of piston in which at least a portion thereof is reinforced by a rigid member to prevent radial collapse. More specifically, the invention aims to provide a deformable piston of tubular character open at both ends and in which one end is reinforced against collapse and the other end is radially bendable.

A further object is to provide a deformable and resilient piston of generally cylindrical shape in which channel or groove means is provided to conduct lubricant axially along the piston to different parts of the outer surface of the piston and to reduce the area of contact between the piston and a cylinder wall.

A still further object of the invention is to provide hydraulic pistons that are simple in design and construction and inexpensive to manufacture. Other objects and advantages will become apparent from the following description of several embodiments of the invention made in connection with the accompanying drawing, in which.

One of the difficulties encountered in operating hydraulic brakes and similar devices is the leakage of the actuating fluid between the piston and the cylinder walls. This leakage occurs in all pistons to some extent but when the pistons are made of metal the leakage becomes excessive after the pistons become worn in use. To some extent leakage has been avoided by the use of rubber caps or disks that seat against the ends of the metal pistons formerly used. Such caps, however, do not retain their shape sufficiently, and, of course, do not materially affect the wearing of the metal piston caused by the sliding of the latter in the cylinder. The present invention provides pistons for use in hydraulic devices and the like in which the wearing surfaces that contact the cylinder walls are formed entirely of a resilient and deformable material, such as rubber or any of numerous synthetic compounds rubber-like in character. The fluid employed in hydraulic brakes and similar devices serves as a lubricant for the deformable material of which the piston is made, so that wear in normal operation is reduced to an unobjectionable minimum.

Figure 1:
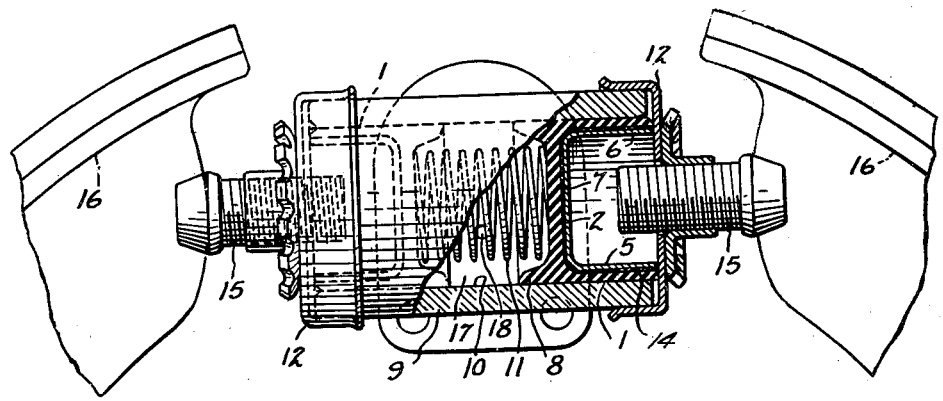
Figure 1 is a somewhat diagrammatic fragmentary elevational view, partly in section and with parts removed, showing my improved piston in the actuating cylinder of a conventional automobile hydraulic brake.

Referring to the drawing by numerals of reference which indicate like parts in the several views, the piston comprises a tubular body portion 1 of generally cylindrical shape formed of resilient deformable material, such as rubber or a synthetic rubber substitute. Preferably, the material is compounded in accordance with well known practice, so as to be of a stiffness corresponding to that employed in vehicle tire treads. Extending across the interior of the tubular body and spaced inwardly from the ends of the latter is an integral dividing member or partition 2 which separates the interior of the body into open ended chambers 3 and 4. The chamber 4 is of greater axial depth than the chamber 3 and receives a rigid reinforcing member 5. This reinforcing member may be conveniently formed as a sheet metal stamping of cup shape having substantially cylindrical side walls 6 and a generally flat bottom 7. The cup or member 5 is so disposed within the hollow rubber piston that the cylindrical wall 6 is embraced by the rubber sleeve or body and the bottom end 7 is disposed against one side of the partition 2. Preferably the rubber of the piston is adhesively bonded at 14 to the outer surface of the cup member 5. Thus the tubular body 1 with the partition member 2 constitutes a resilient and deformable cover for the supporting cup 5 and end 8 of the tube is in the form of an integral axially directed flange that extends from one end of the reinforcing cup 5, and since it is unsupported, is radially bendable. While the end 8 of the tubular piston may be of cylindrical form, it is preferably of conical shape, flared outwardly, with the greatest diameter at the outer or unsupported end. By this arrangement the resilient material of which the end 8 is formed is circumferentially compressed when the piston is placed within operating cylinder 9, as shown in Fig. 1, to maintain a substantially fluid-tight seal with walls 10 of the cylinder.

In the hydraulic brake assembly illustrated, two of the pistons are placed in the cylinder 9 in confronting end to end relation and are yieldingly urged apart by a resilient compression spring 11. Caps 12, slidingly received on the ends of the cylinder 9, bear against the open ends of the reinforcing cups 5 and support actuating studs 15 that bear against brake shoes indicated at 16. When fluid under pressure is admitted to chamber 17 in the cylinder 9 through port 18, the resilient pistons are forced apart by the pressure of the fluid and the resulting axial movement of the pistons and the cylinder 9 urges the brake shoes 16 into engagement with the brake drum (not shown).

A series of axial grooves or channels 19 are formed in the outer surface of the piston body 1 at the end of the latter that embraces the reinforcing cup 5. These surface reducing grooves are each closed at one end, terminating short of the bottom end of the cup, and at its other end each groove opens through the end of the piston. In assembling the brake or hydraulic device the grooves 19 may be packed with lubricant to last for the life of the device, or in operation a slight amount of the brake fluid may pass beyond the end 8 of the piston to lubricate the latter. Such fluid is received and a portion thereof retained in the grooves 19 to lubricate the piston.

As previously mentioned, the conical shape of the end 8 of the piston causes a radial inward bending of such end when the piston is installed in the cylinder 9. This inward bending of the circular flange-like projection at the end of the piston causes a tensioning of the outer surface of the piston along the length of the body 1, including that portion of the body which embraces the reinforcing cup 5. Thus the integral character of the resilient and deformable piston having a continuous surface along its entire length stiffens or reinforces the radially bendable flange 8 and results in the retention of the shape of the conical end flange 8 over prolonged periods of use.

Figure 3:
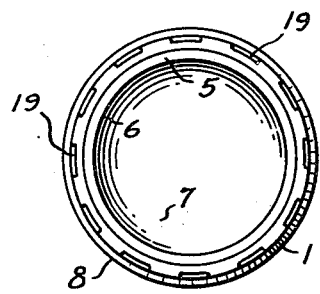
Fig. 3 is an end elevation of the piston shown in Fig. 2.
Figure 4:
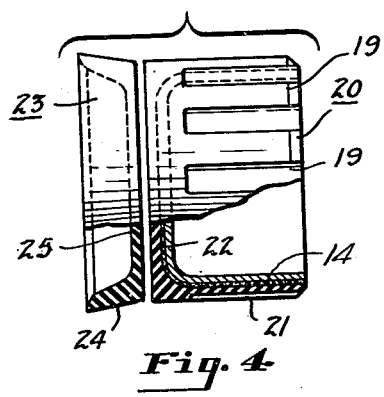
Fig. 4 is a side elevational view, partly in section, showing a modification.

For applications in which the integral construction described above is deemed unnecessary or undesirable, the embodiment shown in Fig. 4 may be employed in which the piston comprises a resilient and deformable cup 20 of rubber or rubber-like material which receives the reinforcing cup member and has a cylindrical portion 21 and a bottom portion 22. If desired, the grooves 19 may be formed in the outer surface of the cylindrical portion 21. A separate cup-like cap 23 replaces the integral flange 8 previously described in connection with Figs. 1 through 3. This cap has a conical portion 24 that is axially aligned with the cylindrical portion 21 and a bottom portion 25 that is disposed, when the piston is in use, against the bottom 22. In the figure the sealing portion 23 is shown spaced from the cup portion 20 for clearness, it being understood that when the composite piston is placed in the operating cylinder the parts are in abutment.

Figure 2:
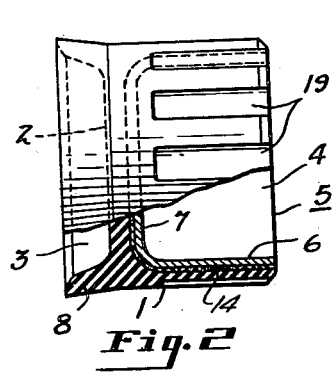
Fig. 2 is a side elevational view of the piston, partly in section.
Figure 5:
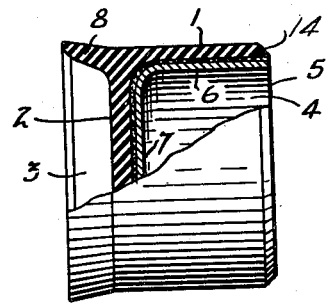
Fig. 5 is a side elevational view of another modification, partly in section and with parts broken away.

Fig. 5 illustrates another modification of the invention which is similar to the embodiment shown in Figs. 1 through 3 except that the grooves or channels 19 have been omitted. These channels, in addition to serving as lubricant retaining passages, also reduce the area of contact between the body of the piston and the walls 10 of the cylinder. Certain applications may require a maximum area of contact between the piston and the cylinder walls and for such use the embodiment of Fig. 5 may be employed. Lubrication of the piston is then effected by other means, such, for example, as permitting a slight leakage of the brake fluid past the sealing end 8 of the piston.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. A piston for a hydraulic device comprising a substantially cylindrical tube of resilient and deformable rubber-like material having an integral partition extending across the interior of the tube and spaced inwardly from both ends of the latter to divide the interior thereof into separated open ended chambers, and a rigid reinforcing member disposed within one of said chambers and embraced by the tube to prevent collapse of the latter.

2. A piston for a hydraulic device comprising a substantially cylindrical tube of resilient and deformable rubber-like material having an integral partition extending across the interior of the tube and spaced inwardly from both ends of the latter to divide the interior thereof into separated open ended chambers, a rigid reinforcing member disposed within one of said chambers and embraced by the tube to prevent collapse of the latter, and a series of grooves, each closed at one end, formed in the external surface of the tube at the end of the latter embracing said member.

HOWARD M. DODGE.